US012754850B2

(12) United States Patent
Hegde et al.

(10) Patent No.: US 12,754,850 B2
(45) Date of Patent: Oct. 6, 2026

(54) SYSTEM AND METHOD FOR STREAMING SESSION DATA MANAGEMENT

(71) Applicant: DISH Network Technologies India Private Limited, Bengaluru (IN)

(72) Inventors: Chinmay Hegde, Bengaluru (IN); Nitin Gupta, Bangalore (IN)

(73) Assignee: DISH Network Technologies India Private Limited, Bengaluru (IN)

( * ) Notice: Subject to any disclaimer, the term of this patent is extended or adjusted under 35 U.S.C. 154(b) by 0 days.

(21) Appl. No.: 18/625,439

(22) Filed: Apr. 3, 2024

(65) Prior Publication Data

US 2025/0315382 A1 Oct. 9, 2025

(51) Int. Cl.

| | |
|---|---|
| ***H04N 7/10*** | (2006.01) |
| ***G06F 12/0891*** | (2016.01) |
| ***H04N 21/433*** | (2011.01) |
| *G06F 16/438* | (2019.01) |
| *H04N 21/234* | (2011.01) |
| *H04N 21/262* | (2011.01) |

(52) U.S. Cl.

CPC ..... *G06F 12/0891* (2013.01); *H04N 21/4331* (2013.01); *G06F 16/4387* (2019.01); *H04N 21/23424* (2013.01); *H04N 21/26258* (2013.01)

(58) Field of Classification Search

CPC ............ G06F 12/0891; G06F 16/4387; H04N 21/4331; H04N 21/23424; H04N 21/26258

See application file for complete search history.

(56) References Cited

U.S. PATENT DOCUMENTS

| | | | | |
|---|---|---|---|---|
| 10,638,180 | B1 * | 4/2020 | Pringle | H04N 21/458 |
| 12,382,126 | B2 * | 8/2025 | Schwartz | H04N 21/4316 |
| 2008/0127246 | A1 * | 5/2008 | Sylvain | H04N 21/6582 348/E7.071 |
| 2012/0047542 | A1 * | 2/2012 | Lewis | H04N 21/44016 725/97 |
| 2013/0051764 | A1 * | 2/2013 | Casagrande | G11B 27/28 386/E5.009 |
| 2013/0290402 | A1 * | 10/2013 | Gavade | H04N 21/4586 709/217 |
| 2014/0173650 | A1 * | 6/2014 | Mathews | H04N 21/6543 725/32 |
| 2015/0365450 | A1 * | 12/2015 | Gaunt | H04L 65/65 709/231 |

(Continued)

*Primary Examiner* — Annan Q Shang
(74) *Attorney, Agent, or Firm* — Kilpatrick Townsend & Stockton LLP

(57) ABSTRACT

Systems, devices, and methods related to providing streaming services and managing streaming session data are provided. An example method includes: receiving a request for streaming a content item in a streaming session, obtaining a content playlist including a plurality of content segments associated with the requested content item, obtaining an Ad response including an Ad playlist of a plurality of Ad segments, sending the Ad response to a storage device, generating a variant manifest file including the content playlist and the Ad segments inserted in the content playlist, initiating playback of the content segments, obtaining a current playback status of the streaming session, and in response to a determination that the playback of the Ad segments has been completed based on the current playback status, automatically executing a cache clearing process to remove the Ad response from the storage device.

20 Claims, 9 Drawing Sheets

(56) References Cited

U.S. PATENT DOCUMENTS

| | | | | |
|---|---|---|---|---|
| 2016/0173961 | A1* | 6/2016 | Coan | H04N 21/8456<br>725/32 |
| 2018/0373748 | A1* | 12/2018 | Kuhnke | H04N 21/2747 |
| 2021/0321170 | A1* | 10/2021 | MacDougall | H04N 21/44222 |
| 2022/0253898 | A1* | 8/2022 | Grover | H04N 21/812 |
| 2022/0321932 | A1* | 10/2022 | Badawiyeh | H04N 21/23424 |
| 2022/0329641 | A1* | 10/2022 | Giladi | H04L 65/75 |

* cited by examiner

SYSTEM AND METHOD FOR STREAMING SESSION DATA MANAGEMENT

BACKGROUND

In the realm of streaming services and digital advertising, optimization of the insertion of advertisements (Ads) into the main streaming content is important for providing a smooth transition and a seamless user experience. Streaming platforms, such as those employing the HTTP Live Streaming (HLS) protocols, often leverage adaptive bitrate streaming to allow user devices to dynamically switch between different media content variants, including main content segments and Ad segments. The process of integrating Ad segments into HLS streaming manifests involves the dynamic inclusion of Ad content within the overall playback sequence of content segments during a streaming session. A significant amount of session data is generated dynamically during the streaming session, and the session data may impose a considerable storage burden for the provider of the streaming platforms.

SUMMARY

In accordance with some embodiments of the present disclosure, a method is provided. The method may be a computer-implemented method. In one example, a method includes: receiving a request for streaming a content item in a streaming session initiated on a user device, obtaining a content playlist including a plurality of content segments associated with the requested content item, sending a request for advertisement (Ad) to be played in an Ad break session within the streaming session to an Ad provider, obtaining an Ad response from the Ad provider. The Ad response includes an Ad playlist of a plurality of Ad segments associated with the Ad. The method further includes: sending the Ad response to a storage device configured to store the Ad response by the storage device, generating a variant manifest file including the content playlist and the Ad segments of the Ad playlist inserted in the content playlist, sending the variant manifest file to the user device configured to initiate playback of the content segments and the Ad segments specified in the variant manifest file by the user device, obtaining real-time user state data indicating a current playback status of the streaming session, and in response to a determination that the playback of the Ad segments in the Ad break session has been completed based on the current playback status of the streaming session, automatically executing a first cache clearing process to remove the Ad response from the storage device.

In accordance with some embodiments of the present disclosure, a user device is provided. In one example, the user device includes: one or more processors and a computer-readable storage media storing computer-executable instructions. The computer-executable instructions, when executed by the one or more processors, cause the user device to perform a method described in the present disclosure.

In accordance with some embodiments of the present disclosure, a system is provided. In one example, the system includes: a user device, a dynamic manifest server, and a storage device. The manifest server is configured to receive a request for streaming a content item in a streaming session initiated on a user device, obtain a content playlist including a plurality of content segments associated with the requested content item, send a request for Ad to be played in an Ad break session within the streaming session to an Ad provider, obtain an Ad response from the Ad provider, the Ad response including an Ad playlist of a plurality of Ad segments associated with the Ad, send the Ad response to the storage device, generate a variant manifest file including the content playlist and the Ad segments of the Ad playlist inserted in the content playlist, send the variant manifest file to the user device, and obtain real-time user state data indicating a current playback status of the streaming session. The user device is configured to initiate playback of the content segments and the Ad segments specified in the variant manifest file by the user device. The storage device is configured to store the Ad response received from the manifest server in the storage device, and automatically execute a cache clearing process to remove the Ad response from the storage device, in response to a determination that the playback of the Ad segments in the Ad break session has been completed, based on the current playback status of the streaming session.

In accordance with some embodiments, the present disclosure also provides a non-transitory machine-readable storage medium encoded with instructions, the instructions executable to cause one or more electronic processors of a computer system or computer device to perform any one of the methods described in the present disclosure.

DETAILED DESCRIPTION

The present disclosure provides systems, devices, and methods generally related to providing streaming services and managing streaming session data.

As mentioned above, a significant challenge arises during the integration of Ad segments with the main streaming content in the process of providing streaming services. The communication between user devices and the streaming service provider generates a significant amount of session data, such as manifest data and Ad response data. This session data, although important for the streaming session, may impose a considerable storage burden. Complicating matters further, accurately determining the precise end of a streaming session is usually very difficult, thus hindering the effective management and cleanup of the session data.

Conventionally, the approach to managing session data involves retaining the session data in storage for a fixed period of at least 24 hours, regardless of the status of the playback of the content and the status of the streaming session (e.g., terminated or completed). The conventional approach could result in unnecessary storage overhead, suboptimal resource utilization, potential privacy concerns, and inefficiencies in the overall management of session data.

The present disclosure provides techniques for addressing the above-mentioned challenges. One insight provided herein is related to the implementation of a new cache eviction policy to provide dynamic and responsive session data management that significantly enhances efficiency in the context of dynamic Ad insertion within HLS manifests. The new cache eviction policy enables accurate and responsive session data management by optimization of storage space through the automatic removal of complete session data, including aged manifest files and Ad responses, within a significantly shorter timeframe (e.g., 3-30 minutes) after the playback of main content is stopped, terminated, or completed. Operating in real-time, the cache eviction policy can be implemented to dynamically adjust the expiry time of session data based on user actions and employing an asynchronous renewal process to avoid impacting response time. Additionally, Ad responses can be promptly and automatically removed from the cache within a short period of time (e.g., 1 minute) after an Ad break session to reduce Time to Live (TTL) and to promote the timely insertion of new Ads. This may further enhance the efficiency of streaming sessions and provide cost-saving benefits for streaming service providers.

Figure 1:
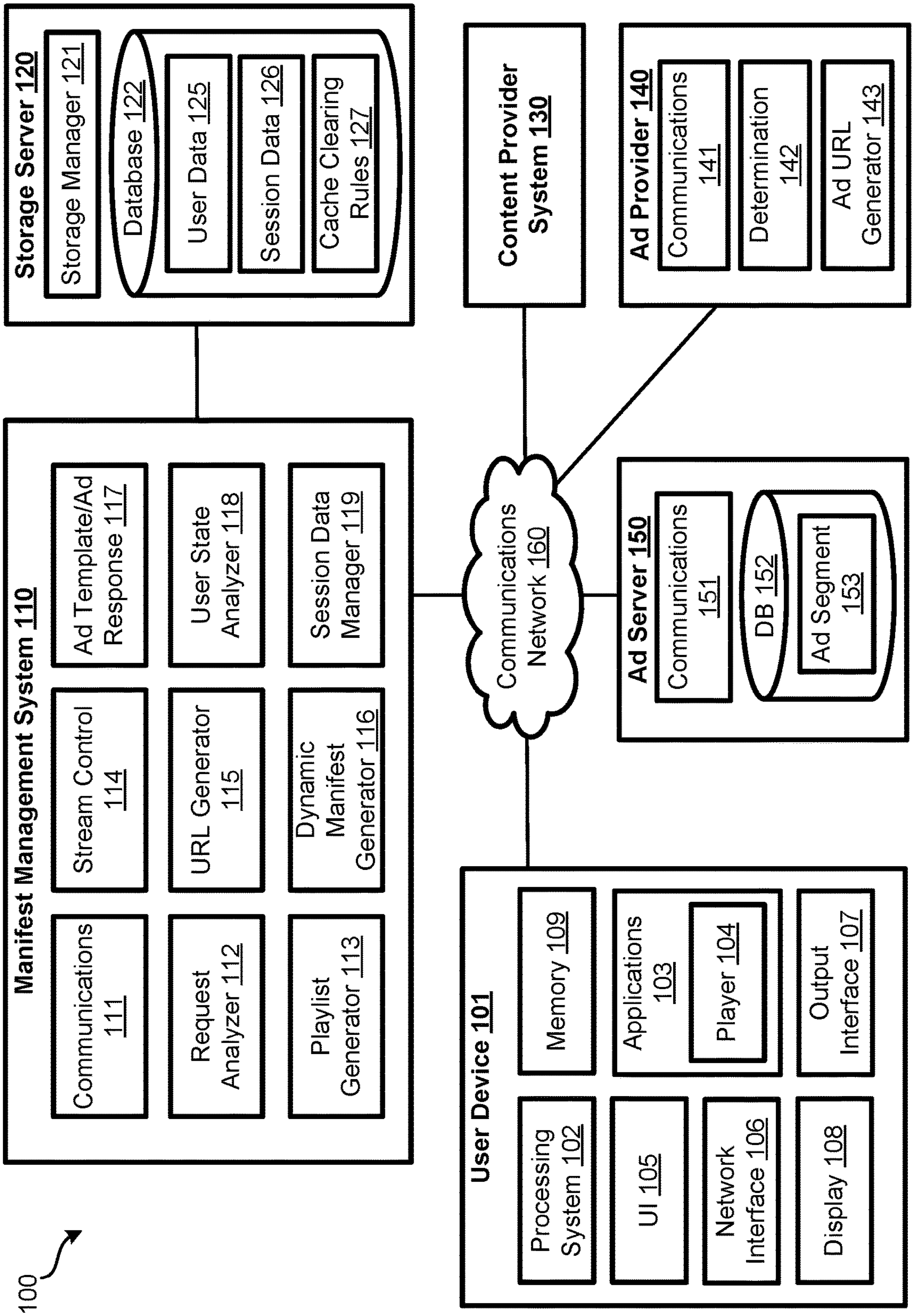
FIG. 1 is a block diagram illustrating an example communications system for managing streaming session data, according to various embodiments of the present disclosure.

FIG. 1 is a block diagram illustrating an example communications system 100 for providing media streaming services and managing streaming session data, according to various embodiments if the present disclosure. In the illustrated example, communications system 100 includes, among other components, user device 101, manifest management system 110 (also known as manifest server of the like), storage server 120, content provider 130, Ad provider 140, Ad server 150, and communications network 160. Each component included in the communications system 100 may be a hardware piece such as a computer device/system or a server, a software piece such as a service, a cloud-based service, and an application, or a combination of hardware and software. Additional or fewer components may be included in the communications system 100.

The user device 101 may be a computerized device such as a smartphone, tablet, computer, smart TV, etc. In some embodiments, the user device 101 includes, among other components, processing system 102, applications (e.g., "apps") 103, user interface (UI) 105, network interface 106, output interface 107, display 108, and memory 109. The processing system 102 includes the CPU (Central Processing Unit) and other processing units that are responsible for executing various applications 103 and performing various computational tasks, including decoding multimedia content, managing streaming protocols, and handling user interface interactions. The applications 103 are software programs stored in memory 109 and responsible for performing specific functions or providing certain features. In some embodiments, the applications 103 include a media player application 104 (hereinafter "player") responsible for handling the playback of multimedia content such as main content of a content item or Ad content of an Ad. The player 104 may be integrated with the UI 105 and present controls and visual feedback on the display 108 for user interaction.

The player 104 may be a product of a player software development kit (SDK), which includes a set of software tools, libraries, and documentation. In some embodiments, player 104 may be specifically designed to integrate with the content provider 130 to deliver a smooth streaming experience on the user device 101. For example, player may include media playback engine responsible for decoding and rendering multimedia content, video and audio synchronization, buffering, and playback controls, application programing interface (API) responsible for starting, pausing, stopping playback, seeking, and retrieving playback status, integration documentation responsible for providing guidelines for integrating player 104 into different platforms or applications, and so on. The player SDK is configured with the capability to play both multimedia content and Ads.

As used herein, "content" refers to any humanly perceptible information, such as video, television programs, audio programs, speeches, concerts, gaming, or otherwise. The content may originate from any source, including live, augmented reality, virtual reality, computer generated, or otherwise. The content may be presented to a given user using any desired user device such as the user device 101. The content may be presented to one or more users "real-time" (which is defined herein to mean as the underlying action provided in such content first occurs in time), on a recorded, time delayed, time shifted, or any other basis. "Main content" refers to the primary audio or video stream that users intend to watch or listen to during a streaming session. "Ad content" refers to the advertisements that are displayed during an Ad break session.

The player 104 may initiate a streaming session once triggered by a user interaction event (e.g., when user clicks a "play" button on the UI 105). A streaming session used herein refers to a continuous and time-bounded period during which a user engages with streaming content through a user device. In digital media streaming, such as video or audio streaming, a streaming session typically begins when a user initiates playback of the main content and ends when the user stops, terminates, or completes the streaming experience. During a streaming session, a user interacts with various content, including the main video or audio content, Ads, and potentially other related data.

The player 104 may also initiate and handle one or more Ad break sessions. The Ad break sessions may be within the same streaming session. An Ad break session within a streaming session, as used herein, refers to a specific period during which one Ad or a series of Ads are played between segments of the main content. In digital media streaming, an Ad break is a designated time interval where Ads are inserted to cause interruption in the main content to allow for the delivery of targeted Ad(s) to the user.

The applications 103 may further include an application, when executed cause the user device to periodically generate a series of status messages (or heartbeat messages) in a frequency (e.g., once per one second) and send the status messages to the manifest management system 110. The application may be triggered upon initiation of the streaming session by player 104. The status messages carry information indicating a current status of the streaming session.

The UI 105 includes a graphical user interface (GUI) displayed on the display 108 and featuring playback controls (play, pause, rewind, etc.), navigation menus, a visually engaging display area, and various interactive elements for user interaction. In some embodiments, the UI 105 may integrate with various multimedia formats, supporting audio, video, and images, and offers playlist management for personalized content experiences. The UI 105 may provide interactive features that respond dynamically to touch gestures, mouse clicks, or remote control inputs. The UI 105 may interact with network interface 106 for online content streaming and may be configured to be responsive across different screen sizes.

Network interface 106 is configured to facilitate communication between the user device 101 and communications network 160, which can include the Internet and, possibly, various other public and/or private networks through which communication with user device 101 can be performed. The multimedia content can be streamed and received by user device 101. In some embodiments, the display 108 is an independent display device connected to the user device 101, for example, via output interface 107. The content output by the user device 101 may be presented by the display 108. In some embodiments, a remote control (not shown) may allow a user to provide input to user device 101 wirelessly through the UI 105.

Communications network 160 communicatively interconnects the various components of communications system 100. The communications network 160 may utilize any known and/or later arising communications and/or networking technologies, standards, protocols or otherwise. Non-limiting examples of such technologies include packet switch and circuit switched communications technologies, such as and without limitation, Wide Area Networks (WAN), such as the Internet, Local Area Networks (LAN), cellular communications networks such as a 3G/4G/5G/6G or other cellular network, Internet of Things (IoT) networks, cloud-based networks, private networks, public networks, or otherwise.

In some embodiments, communications network 160 further includes a Content Delivery Network (CDN) to enhance content delivery. The CDN may be an integral part of the network infrastructure of the communications system 100 and includes content servers, edge servers, routers, load balancers, etc., for optimizing the distribution of multimedia content to user device 101. The content servers may be included in the content provider 130 for storing and hosting multimedia content, edge servers are positioned closer to the user device 101 to cache and deliver content, routers manage the flow of data, and load balancers distribute traffic across servers to optimize content distribution and delivery as well as resource utilization.

In the illustrated example of FIG. 1, the manifest management system 110 includes, among other components, communications component 111, request analyzer 112, playlist generator 113, stream control server 114, Uniform Resource Locator (URL) generator 115, dynamic manifest generator 116, Ad response/template generator 117, user state analyzer 118, and session data manager 119. "Device" used herein refers to a physical hardware component, a software component, or a combination of both, such as a server, an engine, a module, or any tangible or intangible entity or a combination of both that can serve a particular purpose or perform a particular function.

In some embodiments, the manifest management system 110 may correspond to a manifest server/device, or to a manifest builder API, or to a cloud-based service, or other software components that provide manifest-related information that allows a manifest issuer to generate a manifest and manage the storage and transmission of manifest. Manifest issuers such as manifest generator may be implemented as standalone or third-party manifest issuer servers/systems. Additionally or alternatively, manifest generator may be implemented within one or more of the CDNs of the communications network 160 (e.g., a CDN server), a content publisher (e.g., the content provider 130), etc.

The manifest management system 110 may be an integrated system operated by a streaming service provider. Alternatively, various components within manifest management system 110 may be operated by different entities. For example, the playlist generator 113, stream control server 114, and URL generator 115 may be operated by third-party service providers different from the streaming service provider.

The communications component 111 is generally responsible for facilitating data exchange within the manifest management system 110 as well as between the manifest management system 110 and another component within the communications system 100. The communications component 111 may include networking capabilities for sending and receiving messages, signals, content, files and associated metadata, playlist files, stream control files, manifest files, Uniform Resource Locators (URLs), and various other types of data and information. For example, the communications component 111 may facilitate transmitting and receiving messages between the manifest management system 110 and the user device 101.

The request analyzer 112 is generally configured to analyze/process incoming user requests received from various sources such as user device 101, gather relevant information, and trigger appropriate actions within the manifest management system 110. The request analyzer 112 may examine incoming data, which may include user requests for specific content, Ad placement requests, or other types of queries related to streaming sessions, parse content requests, extract relevant parameters, and forward the processed information to other components within the manifest management system 110 for further handling, such as playlist generation, stream control file generation, dynamic manifest generation, etc.

The playlist generator 113 is configured to produce a playlist file (also known as a "cliplist") as a response to user requests within the manifest management system 110. When a user request is received, typically specifying a particular content item for streaming and viewing, the playlist generator 113 is activated. In response, the playlist generator 113 creates a playlist file that outlines the sequence of content segments (also known as clip segments) associated with the specified content item. The playlist file serves as a structured guide for the streaming process and provide information on the order and characteristics of the content segments to be delivered to the user device 101. For example, if a user requests a specific video, the playlist generator 113 would compile a playlist file that enumerates the individual video segments of the video. The playlist file may include details such as the identity and characteristics of each content segment to allow the streaming service to efficiently deliver the requested content item to the user.

The content segments specified in the playlist file can encompass both main content segments and Ad segments, and their sequence within the playlist file determines the order in which they are presented during the streaming session. The playlist file may contain sequence information indicating or identifying the position of each ad segment in relation to the main content, which is determined by preestablished Ad placement rules.

The stream control server 114 is configured to generate a stream control file that organizes content segments in the sequence established by the playlist file within the manifest management system 110. The stream control file is used to control and orchestrate the streaming session and contains information about the arrangement and structure of the content segments, including segment durations, encoding settings, resolution, bitrates, and other technical specification and metadata necessary for the delivery and playback of content segments.

The URL generator 115 is configured to generate/obtain URLs for content segments (e.g., main content segments and/or Ad segments). In some embodiments, the URL generator 115 may generate URLs for the main content segments (i.e., content segment URLs) of the content item. For example, the content item is segmented into smaller, manageable portions or segments. These content segments could represent portions of a video, audio, or other multimedia content of the content item. Segmentation may be performed by the content provider 130. Each content segment is assigned a unique identifier or name. The identifier distinguishes one segment from another and is used for creating distinct URLs. A base URL may be established, representing the root or common part of the URL for the entire content item. The base URL may include information such as the domain name and directory structure. The unique identifier assigned to each content segment is appended to the base URL to create a specific URL for each content segment and to allow the user device to locate and retrieve the content segment. In some embodiments, The URL generator 115 may further apply URL encoding to handle special characters or spaces within the segment identifiers according to preestablished URL encoding rules. In some embodiments, each content segment may have a predetermined length representing a time duration, for example, 2 seconds, 5 seconds, etc. Alternatively, the content segment URLs may be generated by the content provider 130, transmitted to and received by the manifest management system 110.

In a similar manner, the URL generator 115 may also generate URLs for Ad segments (i.e., Ad segment URLs) of an Ad to-be-played in an Ad break session. Alternatively, the Ad segment URLs may be generated by the Ad URL generator 143 of the Ad provider 140, transmitted to and received by the manifest management system 110.

The dynamic manifest generator 116 is configured to compile/integrate the playlist file, stream control file, and the generated URLs, and other pertinent metadata and information to generate manifest files. A manifest file used herein refers to a structured document that provides essential information about the organization, sequencing, and technical details of multimedia content to be delivered during a streaming session. Manifest files may have different types based on the streaming protocol used, such as HTTP Live Streaming (HLS) or Dynamic Adaptive Streaming over HTTP (DASH). Manifest files outline the structure and organization of the multimedia content, including the sequence of individual segments or chunks that make up the complete content item, contain URLs or references to the individual content segments to allow the user device 101 to dynamically fetch these segments during playback. Manifest files include technical specifications such as bitrates, resolutions, codecs, and other encoding details for each content segment to guide the rendering process. For live streaming or linear channels, manifest files may also include playlist/cliplist information to specify the sequence and timing of upcoming content segments.

In certain embodiments, the HLS streaming protocols are used, and the manifest file is an HLS manifest file. The HLS manifest file may encompass a master HLS manifest file (i.e., master manifest file) and a variant HLS manifest file (i.e., a variant manifest file). The master HLS manifest file is a high-level document that provides an overview of the available variants of the content and may include references or URLs to variant HLS manifest files, each representing a different version of the content at specific bitrates or resolutions. Variant HLS manifest files are more granular documents associated with specific bitrates, resolutions, or other metadata for streaming the content segments. These files contain detailed information about individual content segments, their URLs, and technical specifications. For example, each variant manifest file may correspond to a particular version of the content to allow for adaptive streaming where the user device can dynamically switch variants or play in a sequence to optimize playback based on changing network conditions.

In some embodiments, the rolling HLS variant manifest (also known as "chunked manifest" or "sliding window manifests") may be generated. Rolling variant manifest files, in the context of HLS, refer to dynamic and periodically updated variant manifest files that outline the sequences and details of content segments for adaptive bitrate streaming. The rolling variant manifest files are generated at regular intervals, for example, every few seconds. Each rolling variant manifest file reflects the current state of the streaming session, including changes in network conditions and available content variants. Each rolling variant manifest file specifies the sequence of content segments associated with a particular time window. Each update introduces a new set of content segments and adjusts the temporal window to represent the most relevant portion of the streaming timeline. Consecutive updates of the rolling variant manifest files may include an overlap of content segments with the previous version. The overlap allows for smooth transitions during playback and continuous streaming without interruptions when the user device 101 switches between different content variants.

The manifest files and other data pertaining to the streaming session (collectively referred to as "session data 126") may be stored in the database 122 of the storage server 120. In some embodiments, at least a portion of the manifest files such as the master and variant manifest files dynamically generated during streaming may be stored in the storage server 120. The manifest files can be retrieved or fetched by the user device 101 and the manifest management system 110. For example, the user device 101 may fetch the variant manifest file according to the associated URLs included in the master manifest file. The user device may fetch content segments according to the associated URLs included in the variant manifest files for streaming.

The Ad template/response manager 117 is responsible for creating templates that define the structure and layout of Ads to be played during one or more Ad break sessions within the streaming session. In some embodiments, the Ad template/response manager 117 is included in the Ad provider 140. The Ad templates serve as frameworks for organizing Ad content and can be stored as session data 126 in database 122. An example Ad template may include various configuration parameters such as a placeholder for the duration or time length of the ad, a generic field for specifying media elements, such as images, videos, or audio clips, placeholder fields for various text elements, generic fields for branding elements and logos, placeholder fields for interactive elements, such as clickable areas or buttons, default display frequency, default dimensions and formats for the ad, among others.

In some embodiments, the Ad template/response manager 117 may also be configured to categorize or classify the Ad templates based on various attributes, characteristics, or predefined criteria. In some embodiments, the Ad templates can be classified based on the characteristics of the content item, for example, the theme or genre of the associated content item, the visual style of the content item, the tone and mood of the content item, the duration of the associated content item, the contextual relevance to the content item, the demographics of the audience engaging with the associated content, among others. The Ad template/response manager 117 may identify an Ad template to be used for playing during Ad break session. For example, the Ad response/template manager 117 may obtain the characteristics, theme, or relevant attributes of the main content within the streaming session and utilize the classification information associated with Ad templates to identify an Ad template that align with the characteristics of the ongoing main content and/or the desired advertising goals.

The Ad template/response manager 117 is further configured to receive an Ad response. The Ad response can be generated by the Ad provider 140 and transmitted to the Ad template/response manager 117. An Ad response refers to the data or information received from an Ad provider 140 in response to an Ad request sent from the manifest management system 110. Ad response contains details about the Ad or multiple Ads that are intended to be displayed/presented during one or more Ad break sessions within a streaming session. For example, an Ad response may include Ad identifier, Ad segment metadata (Ad title, description, duration), Ad segment sequence numbers, beacon URLs associated with the Ad segment (supporting user interactions with the advertisement, such as impressions, clicks, and completions), Ad segment URLs, Ad playback instruction, Ad playback restrictions, interactive elements associated with the beacon URLs, etc. Once the Ad response is received in the manifest management system 110, it may be timely included in the variant manifest files by the dynamic manifest generator 116.

The user state analyzer 118 is responsible for analyzing and managing the user state associated with a streaming session. The user state analyzer 118 is configured to analyze the status messages generated by and received in the manifest management system 110, obtain information such as user interactions with player 104, initiation of a streaming session, playback activities, and the cessation or termination of streaming sessions. The user state analyzer 118 is also configured to obtain the state of each Ad break session within the streaming session in real-time. For example, the user state analyzer 118 may track which content segments have been delivered and presented, which Ad segments have been delivered and presented, and the current playback position (e.g., the sequence number of the current content segment or Ad segment being played) within the streaming session. The user state analyzer 118 is further configured to track the Ad responses generated delivered to and received by the user device 101, analyze various user interaction events, such as pause/resume actions, detect changes in content quality, and so on. Various user state data 125 may be generated in real time by the user state analyzer 118 and stored in the database 122. The user state data 125 may be further used to determine the retention and eviction of session data.

The session data manager 119 is configured to analyze the session data 126 generated in real time and determine the temporal characteristics of the session data, based on the user state data 125. The session data 126 includes but is not limited to the manifest files (e.g., variant manifest files, rolling manifest files, etc.), Ad template, Ad response, and other data or information pertaining to the streaming session.

In some embodiments, the session data manager 119 may include a timer configured to assign timestamps to session data, including manifest files, indicating the precise moment of their generation. Utilizing the timestamps, the session data manager 119 may calculate the time duration for each set of session data (e.g., each variant manifest file), determine how much time has elapsed since the session data was initially generated, and/or determine how much time has elapsed since the completion of the content segments associated with a manifest file. For example, the session data manager 119 may calculate the time duration for a manifest file since the completion of the Ad(s) associated with the manifest file by player 104. By considering the elapsed time duration since session data generation or content/Ad completion, the session data manager 119 dynamically assesses the aging of session data. Older session data may be treated differently in terms of preestablished retention policies or storage management. Time-based calculations performed by the session data manager 119 can trigger cleanup decisions. For example, if a certain period has elapsed since the completion of an Ad, the associated manifest file or session data may be flagged for removal.

In some implementations, the session data manager 119 has the capability to automatically calculate the current playback position, eliminating the necessity for regular status messages. For example, the session data manager 119 can utilize the master manifest timestamp (e.g., indicating the start time of playback within the streaming session) in conjunction with the current time. By computing the disparity between the start time and the present time, the session data manager 119 can estimate the current playback position, thus obviating the need for frequent updates from the player through status messages. In some embodiments, fine-tune logics may be implemented by the session data manager 119, taking into factors such as buffering, latency, and other delays inherent in the streaming system to adjust the estimation of the current playback position.

In the illustrated example of FIG. 1, the storage server 120 includes a storage manager 121 and one or more databases 122. As mentioned above, the database 122 is configured to store the user state data 125 and session data 126 generated by the manifest management system 110. The database 122 may further store various cache clearing rules 127. The cache clearing rules 127 are predetermined and adjustable. For example, the cache clearing rule 127 may include a session data expiration rule that sets a time limit for how long specific types of session data can remain in the cache. For example, a particular set of session data, including the variant manifest files and Ad responses, may have an expiration time of 6 minutes. The cache clearing rule 127 may include an event-driven clearing rule specifying events or actions that trigger cache clearing of the database 122. For example, the cache associated with a particular streaming session is cleared when the playback stops for a predetermined threshold time duration (e.g., 30 seconds), indicating the end of the streaming session. The cache clearing rule 127 may include an Ad-specific rule. For example, the cache associated with a particular Ad break session may be cleared since the playback of Ads associated with the Ad responses is completed by player 104 or after a predetermined time duration (e.g., 1 minute) has elapsed since the completion of the playback of the Ads. The cache clearing rule 127 may include a storage capacity rule specifying a storage threshold that triggers cache clearing when the storage capacity reaches the threshold or when the accumulated session data reaches a threshold storage size.

In some embodiments, the database 122 may be a cloud-based server or service. For example, the database 122 may be a remote dictionary server (Redis), which is an in-memory data structure store capable of fast reading and writing. In some embodiments, the database 122 may be an in-memory caching service, such as Amazon ElastiChache, configured to deploy, operate, and scale popular in-memory cache engines like Redis and Memcached in the cloud.

The storage manager 121 is configured to execute cache clearing and remove the associated session data 126 from the database 122 when the cache clearing is triggered according to the selected cache clearing rules and/or upon receiving a notification triggering the cache clearing from the manifest management system 110.

The Ad provider 140 may include a server or computing system that further includes a communications module 141, an Ad determination module 142, and an Ad URL generator 143. The communications module 141 is responsible for facilitating communication (e.g., signal transmission and reception, message exchange, file transfer, etc.) between the Ad provider 140 and various other components of the communications system 100. In some embodiments, the communications module 141 enables the Ad provider to receive an Ad request from the manifest management system 110 and send an Ad response to the manifest management system 110. In some embodiments, the Ad request may include various information such as the streaming session information, Ad break session information, main content information, user information, and so on. The communications module 141 may also enable the Ad provider 140 to communicate with Ad server 150 to locate the Ad segments associated for playback in the Ad break session. In some embodiments, the communications module 141 enables the Ad provider 140 to send an Ad segment request to the Ad server 150 and receive an Ad segment response containing the Ad segment information from the Ad server 150.

The Ad determination module 142 is configured to determine an Ad item (e.g., an Ad item, an Ad clip, an Ad segment, a list of Ad clips or Ad segments, etc.) to be played within the streaming session by player 104. In some embodiments, the Ad determination module 142 may analyze the Ad request to extract the various information included in the Ad request and determine the Ad segment based on the information. The Ad URL generator 143 is responsible for generating the Ad segment URL corresponding to the Ad segment or Ad item determined by the Ad provider 140, based on the location of the Ad segment and Ad item within the Ad server 150. The Ad segment URL may be included in the Ad response to be sent to the manifest management system 110 in response to an Ad request.

Ad server 150 may include a server or computing system that further includes a communications module 151 and an Ad database 152. The communications module 151 is responsible for facilitating communication (e.g., signal transmission and reception, message exchange, file transfer, etc.) between the Ad server 150 and various other components of the communications system 100. The Ad database 152 is configured to store the Ad segments or Ad item to be played in the Ad break session within a streaming session. The Ad segment may be fetched or retrieved by the user device 101 or other components within the communications system 100. In some embodiments, Ad server 150 may provide location information of a particular Ad segment to the Ad provider 140, and Ad provider 140 may generate an Ad segment URL corresponding to the Ad segment, based on the location information.

It should be noted that variations of the communications system 100 are also within the scope of the present disclosure. In some embodiments, the manifest management system 110 may be integrated to the content provider 130. In some embodiments, the URL generator 115 and the Ad URL generator 143 are integrated to form a single URL generator. In some embodiments, the Ad server 150 is integrated to the Ad provider 140.

Figure 2A:
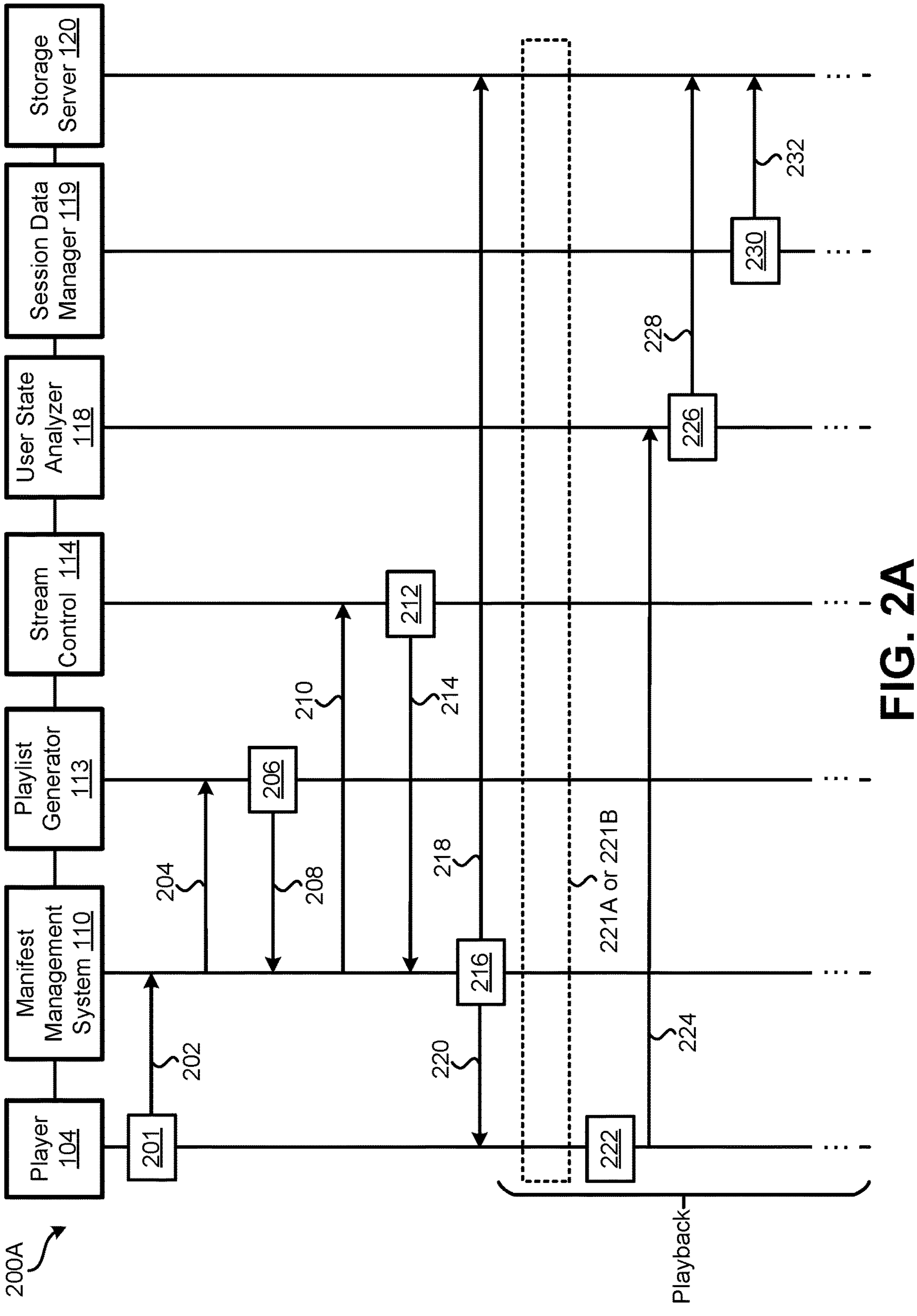
FIGS. 2A-2E are message flow diagrams respectively illustrating examples of interaction among components in the communications system of FIG. 1, according to various embodiments of the present disclosure.

FIGS. 2A-2E are message flow diagrams respectively illustrating example processes for providing streaming services and managing streaming session data, according to various embodiments of the present disclosure. FIG. 2A illustrates an example of flow process 200A. Process 200A may commence when a user operating a user device 101 activates a player 104 on the user device 101 to initiate a streaming session to consume multimedia content of a content item within the streaming session. For example, player 104 may generate (FUNCTION 201) a manifest request and send the manifest request (TRANSMISSION 202) to the manifest management system 110 for playing/streaming main content of a content item. Upon receiving the manifest request, the manifest management system 110 may send a request (TRANSMISSION 204) for a playlist file to the playlist generator 113. The request may contain user information such as user identity, user authentication information, and account information, information about the requested content item, etc. In some embodiments, the manifest management system 110 may perform authentication to authorize the user based on the user information.

Upon receiving the playlist request, the playlist generator 113 may generate (FUNCTION 206) a playlist file and send (TRANSMISSION 208) the playlist file to the manifest management system 110. In some implementations, the playlist generator 113 may receive the playlist file from the content provider 130 that provides the content item. As mentioned above, the playlist file may contain information about the content item (a list of content segments of the content item) as well information about the Ad (e.g., a list of Ad segments of the Ad) to be inserted to streaming of the content item.

The manifest management system 110 may send (TRANSMISSION 210) a request for a stream control file for controlling the streaming of the content item to the stream control server 114. Upon receiving the request, the stream control server 114 in response may generate (FUNCTION 212) a stream control file and send (TRANSMISSION 214) the stream control file to the manifest management system 110. As mentioned above, the stream control file contains information about the arrangement and structure of the content segments and the Ad segments, including segment durations, encoding settings, resolution, bitrates, and other technical specification and metadata necessary for the delivery and playback of content segments and Ad segments within the streaming session.

The manifest management system 110 may generate a master manifest file (FUNCTION 216), based on the information provided in the playlist file and the stream control file, as well as other metadata or information about the content item and/or Ads that are to be played in the streaming session. The manifest management system 110 may instantly send (TRANSMISSION 218) the master manifest file to the storage server 120 to allow the master manifest file to be stored in the storage server 120. The master manifest file may be periodically fetched or retrieved by the manifest management system 110 to generate session data such as variant manifest files based on the information provided in the master manifest file. The manifest management system 110 may further generate a manifest response including the master manifest file and send (TRANSMISSION 220) the manifest response to player 104.

In process 221A or 221B (collectively as 221), player 104 may periodically generate a series of variant manifest requests at a time interval based on the master manifest file received in player 104. The player 104 may send the variant manifest requests to the manifest management system 110. In response, the manifest management system 110 may correspondingly generate and send variant manifest files back to player 104. Various session data (e.g., variant manifest files, Ad template, Ad responses, etc.) may be received in and/or generated by the manifest management system 110. The session data are temporarily stored in the storage server. More details about the process 221 are described below with reference to FIG. 2B.

Upon receiving the variant manifest response including the initial variant manifest file, player 104 may initiate (FUNCTION 222) playback of the content item associated with the variant manifest file and continue (FUNCTION 222) the playback of the content item according to the subsequent variant manifest files received in player 104.

During playback within the streaming session, player 104 may periodically send (TRANSMISSION 224) status messages to the user state analyzer 118 at a time interval (e.g., once per one second). The status message includes information about the current status of the streaming session and/or the current user state. The user state analyzer 118 may process the status messages and determine (FUNCTION 226) a current user state and/or status of the streaming session (e.g., the current content segment, the current Ad segment). The user state analyzer 118 may further determine a time duration between the current playback state and the upcoming Ad, based on the sequence of the segments included in the variant manifest files as well as the current playback status of the streaming session. The user state analyzer 118 may further generate (FUNCTION 226) user state data based on the received status messages and send (TRANSMISSION 228) the user state data to the storage server 120, where the user state data is stored.

During playback within the streaming session, the session data manager 119 may determine the age of the session data (e.g., manifest files, Ad template, Ad responses, etc.) received in and/or generated by the manifest management system 110. For example, the session data manager 119 may assign timestamp (FUNCTION 230) to the session data and send (TRANSMISSION 232) the timestamped session data to the storage server 120. The session data manager 119 may further calculate a time duration after the completion/termination of the streaming session.

Figure 2B:
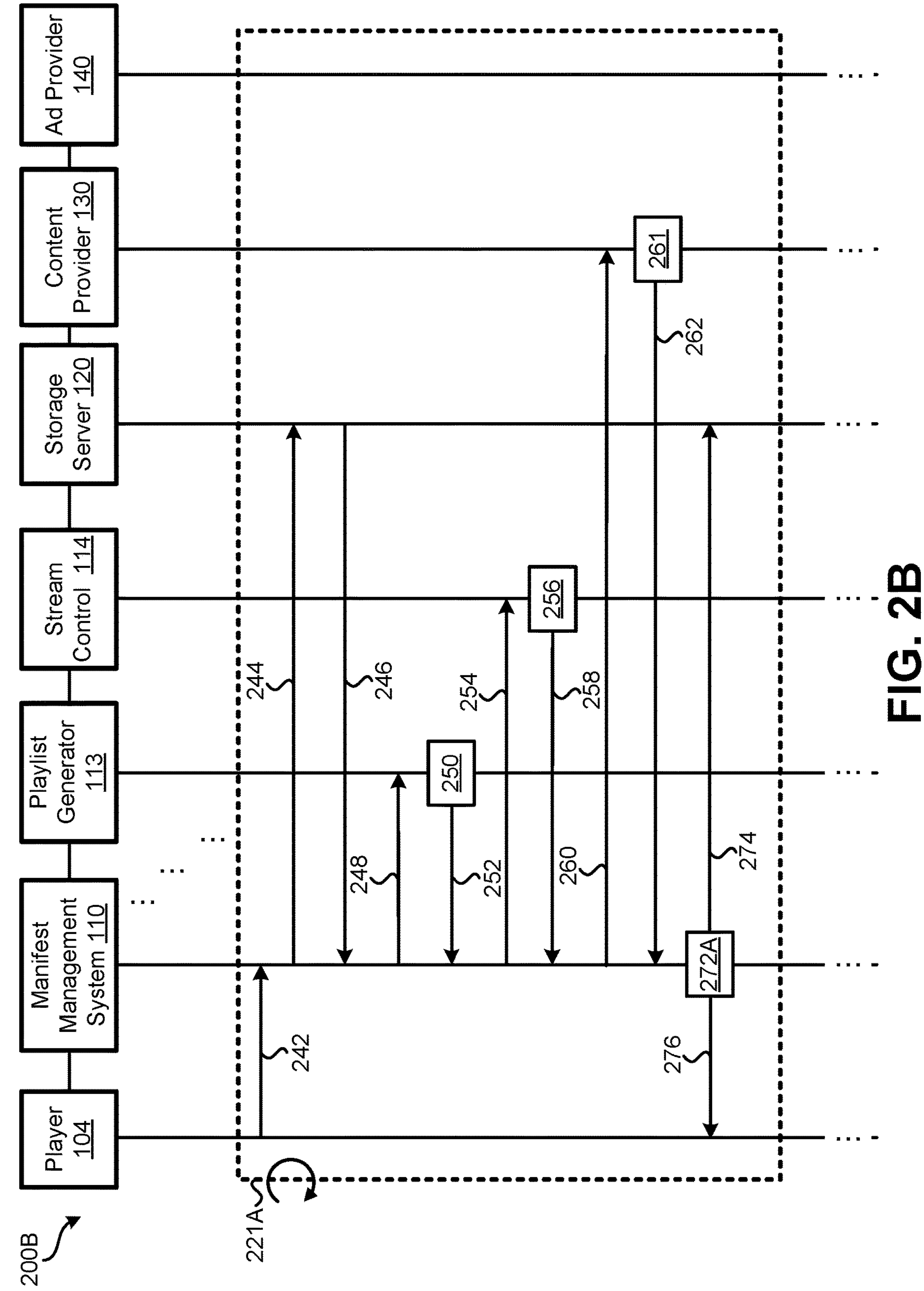

FIG. 2B illustrates an example of flow process 200B. Process 200B provides an example the process 221A of FIG. 2A. As mentioned above, a series of variant manifest files (e.g., rolling variant manifest files) supporting the streaming session are generated in the process 221A. In the illustrated example, a specific process 200B commences when player 104 sends (TRANSMISSION 242) a variant manifest request to the manifest management system 110. In response, the manifest management system 110 sends (TRANSMISSION 244) a query for the current state of the streaming session to the storage server 120. In response, the storage server 120 may sends (TRANSMISSION 246) the user state data indicating the current state of the streaming session to the manifest management system 110 or allow it to fetch the user state data from the storage server 120.

The manifest management system 110 sends (TRANSMISSION 248) a request for a playlist to the playlist generator 113. In response, the playlist generator 113 generates (FUNCTION 250) a playlist for streaming within a timeframe (e.g., from time zero to 10 minutes) and sends (TRANSMISSION 252) the playlist to the manifest management system 110. As mentioned above, the playlist may include information about the content segments to be played in the streaming session within the specified timeframe and/or the Ad segments to be played in one or more Ad break sessions within the same streaming session and the specified timeframe.

The manifest management system 110 sends (TRANSMISSION 254) a request for an stream control file to the stream control server 114. In response, the stream control server 114 generates (FUNCTION 256) a stream control file for streaming within the specified timeframe and sends (TRANSMISSION 258) the stream control file to the manifest management system 110. As mentioned above, the stream control file includes information about the arrangement and structure of the content segments and/or Ad segments, such as segment durations, encoding settings, resolution, bitrates, and other technical specification and metadata necessary for the delivery and playback of content segments and/or Ad segments within the specified timeframe.

The manifest management system 110 sends (TRANSMISSION 260) a request for content segment URLs associated with or corresponding to the content segments according to the playlist file and stream control file to the content provider 130. In response, the content provider 130 generates/identifies (FUNCTION 261) the requested content segment URLs as well as metadata associated with blackout identification and Ad forecast and sends (TRANSMISSION 262) the requested content segment URLs to the manifest management system 110.

The manifest management system 110 generates (FUNCTION 272A) a variant manifest file for streaming within the initial timeframe, based on the information provided in the playlist received from the playlist generator 113, the information provided in the stream control file received from the stream control server 114, the content segment URLs corresponding to the content segments specified in the playlist file and received from the content provider 130, as well as other relevant metadata and specification. The manifest management system 110 sends (TRANSMISSION 274) a variant manifest response including the variant manifest file to player 104 to allow player 104 to initiate/maintain playback within the specified timeframe of the streaming session according to the variant manifest file. The manifest management system 110 also sends (TRANSMISSION 276) the variant manifest file to the storage server 120 to cause the storage server 120 to store the initial variant manifest file in the database of the storage server 120. In some embodiments, the manifest management system 110 may timestamp the variant manifest file before sending it to the storage server 120.

Process 221A may be repeated during the playback within the streaming session, such that multiple subsequent variant manifest files (i.e., rolling variant manifest files) can be generated continuously in series at a frequency or time interval. Each subsequent variant manifest corresponds to an updated timeframe for streaming, reflecting the evolving state of the content delivery. Each subsequent variant manifest may be generated, based on the information included in the preceding variant manifest file stored in the storage server 120.

Figure 2C:
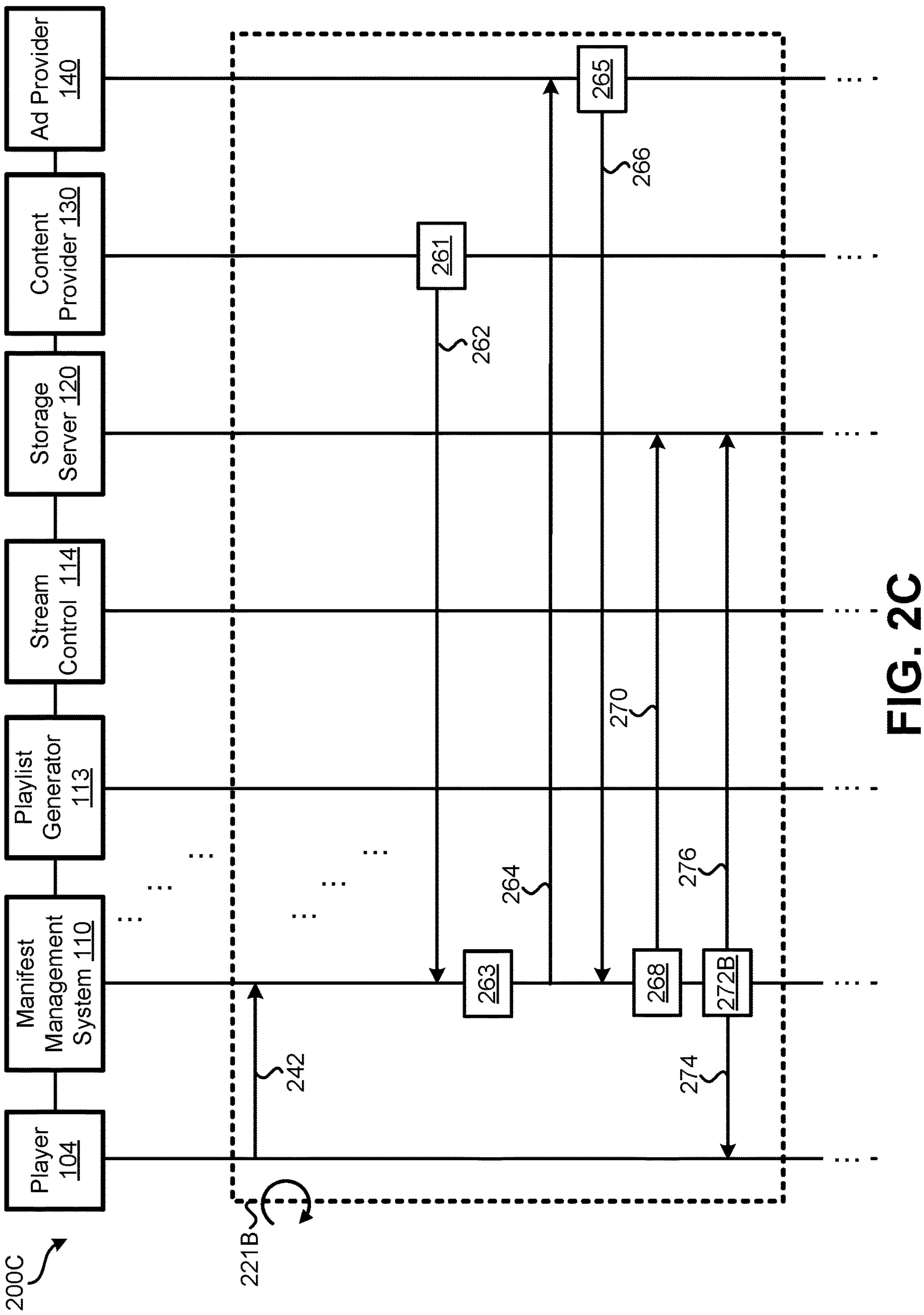

FIG. 2C illustrates an example of flow process 200C. Process 200C provides an example the process 221C of FIG. 2A. Process 221C is a variation of process 221B and may include operations 242-262. Upon receiving the content URLs from the content provider 130, the manifest management system 110 determines (FUNCTION 263) that an upcoming Ad segment is within a predetermined time duration (e.g., 30 seconds) from the current playback status of the streaming session, based on the user state data and the playlist.

The manifest management system 110 sends (TRANSMISSION 264) an Ad request for Ad segment URLs associated with or corresponding to the Ad segments according to the initial playlist file and stream control file to the Ad provider 140. In response, the Ad provider 140 generates (FUNCTION 265) an Ad response including the requested Ad segment URLs, an Ad template, as well as other metadata and specification pertaining to the streaming of the Ad segments. The Ad provider 140 sends (TRANSMISSION 266) the Ad response to the manifest management system 110. The manifest management system 110 assigns a timestamp (FUNCTION 268) to the received Ad response and sends the timestamped Ad response to the storage server 120 to cause the storage server 120 to store the timestamped Ad response.

The manifest management system 110 generates (FUNCTION 272B) a variant manifest file for streaming within the corresponding timeframe, based on the information provided in the corresponding playlist received from the playlist generator 113, the information provided in the corresponding stream control file received from the stream control server 114, the corresponding content segment URLs received from the content provider 130, the corresponding Ad response received from the Ad provider 140, as well as other relevant metadata and specification. Similar to process 221A, the manifest management system 110 sends (TRANSMISSION 274) a variant manifest response including the variant manifest file to player 104 to allow player 104 to initiate/continue playback of the content segment within the specified timeframe of the streaming session according to the variant manifest file. The manifest management system 110 also sends (TRANSMISSION 276) the variant manifest file to the storage server 120 to allow the storage server 120 to save the variant manifest file in the database of the storage server 120. In some embodiments, the manifest management system 110 may timestamp the variant manifest file before sending it to the storage server 120 for storage.

Figure 2D:
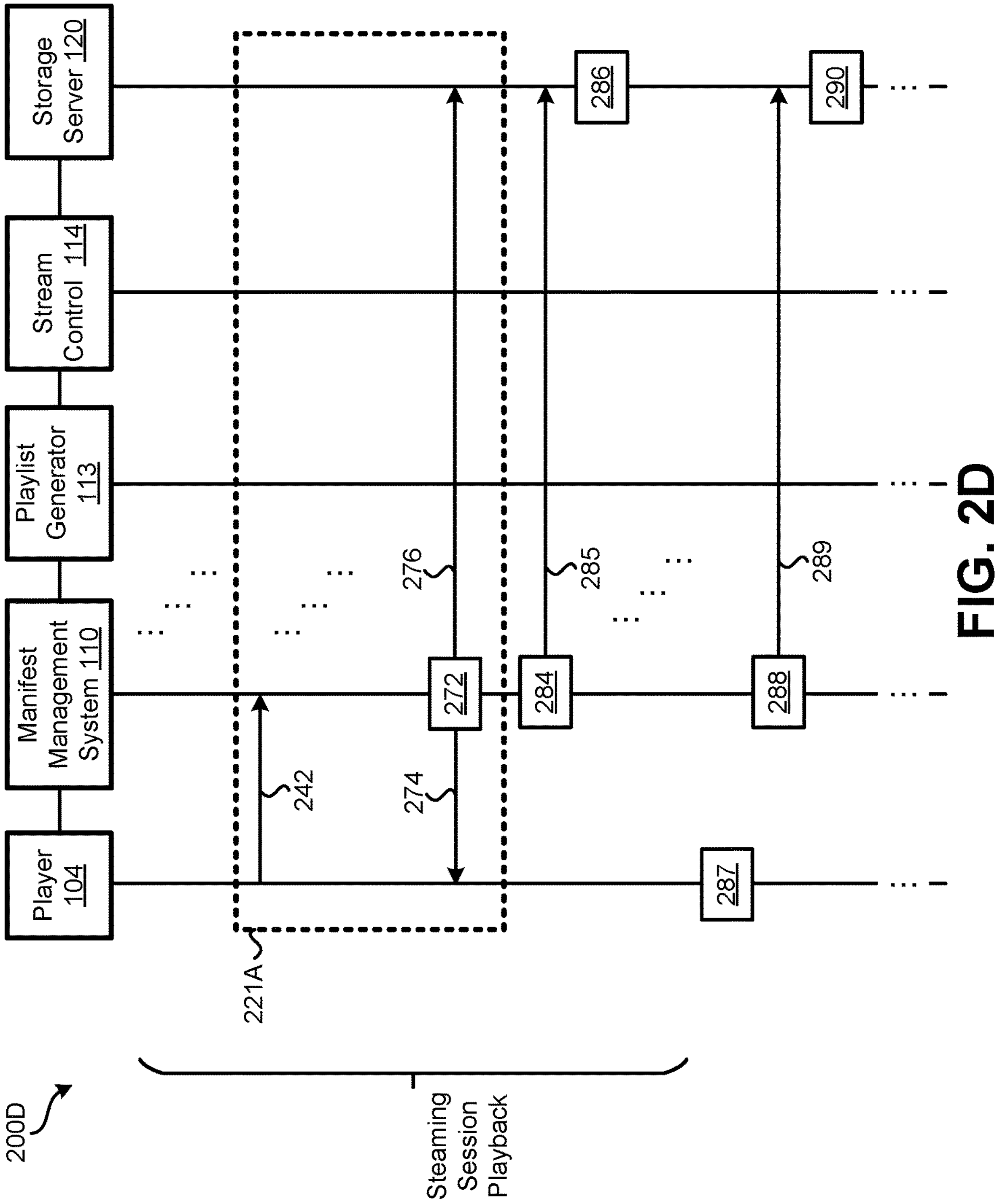

FIG. 2D illustrates an example of flow process 200D. In the illustrated example, processes 221A/221B are repeated during the playback of content segments and/or Ad segments within the streaming session. After a specific process 221A, the manifest management system 110 determines (FUNCTION 284) that a predetermined time duration (e.g., 6 minutes) has elapsed since the completion of the playback of the content segments specified in the variant manifest file generated in the process 221A. The manifest management system 110 sends (TRANSMISSION 285) a notification to the storage server 120 indicating that the variant manifest file has been aged since its generation by the elapsed time duration. The storage server 120 (FUNCTION 286) executes a cache clearing process to identify the variant manifest file stored therein and remove it from the storage server 120. Alternatively, the storage server 120 may automatically remove (FUNCTION 286) the variant manifest file stored therein, based on a determination that that the variant manifest file has been aged since its generation by the elapsed time duration, based on the current state of the streaming session from obtained from the user data and the timestamp of the variant manifest file.

The player 104 stops/terminates (FUNCTION 287) the streaming session or otherwise indicates that the streaming session has been terminated or completed. The player 104 stops generating and sending the variant manifest request to the manifest management system 110. The manifest management system 110 determines (FUNCTION 288) that a predetermined time duration (e.g., 6 minutes) has elapsed since the termination/completion of the streaming session and sends (TRANSMISSION 289) a notification to the storage server 120 indicating the termination/completion of the streaming session and the elapsed time duration thereafter. The storage server 120 (FUNCTION 290) executes a cache clearing process to remove all session data (e.g., the master manifest file and all variant manifest files) from the storage server 120. Alternatively, the storage server may automatically remove (FUNCTION 290) the session data associated with the streaming session, based on a determination that a predetermined time duration has elapsed since the termination/completion of the streaming session, based on the current state of the streaming session from the user data and the timestamp of the manifest files.

Figure 2E:
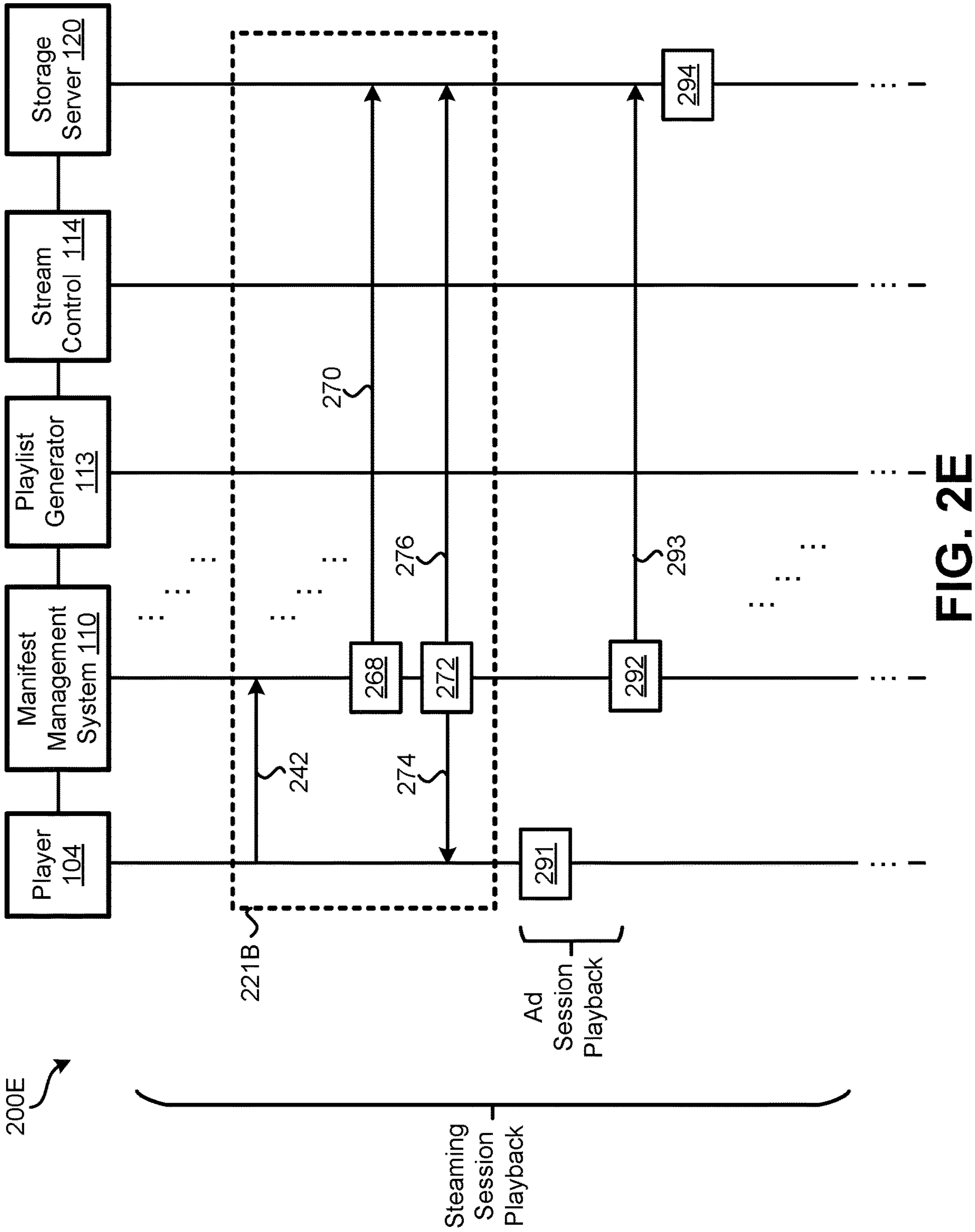

FIG. 2E illustrates an example of flow process 200E, which is a variation of flow process 200D. In the illustrated example, processes 221A/221B are repeated during the playback of content segments and/or Ad segments within the streaming session. After a given process 221B, player 104 initiates (FUNCTION 291) an Ad break session for playback of the Ad segments specified in the variant manifest file generated in the process 221B. The manifest management system 110 determines (FUNCTION 292) that the Ad break session has been completed or that the playback of the Ad segments specified in the variant manifest file has been completed. Alternatively, the manifest management system 110 may determine (FUNCTION 292) that a predetermined time duration (e.g., 1 minute) has elapsed since the completion of the Ad break session or the completion of the playback of the Ad segments specified in the variant manifest file.

The manifest management system 110 sends (TRANSMISSION 293) a notification to the storage server 120 indicating the completion of the Ad break session or the completion of the playback of the Ad segments specified in the variant manifest file. The storage server 120 (FUNCTION 294) executes a cache clearing process to identify the Ad response associated with the variant manifest file stored therein and remove it from the storage server 120. Alternatively, the storage server 120 may automatically remove (FUNCTION 294) the Ad response associated with the variant manifest file stored therein, in response to a determination that the playback of the Ad segments specified in the Ad response has been completed, based on the current state of the streaming session from the user data and the timestamp of the Ad response.

Figure 3A:
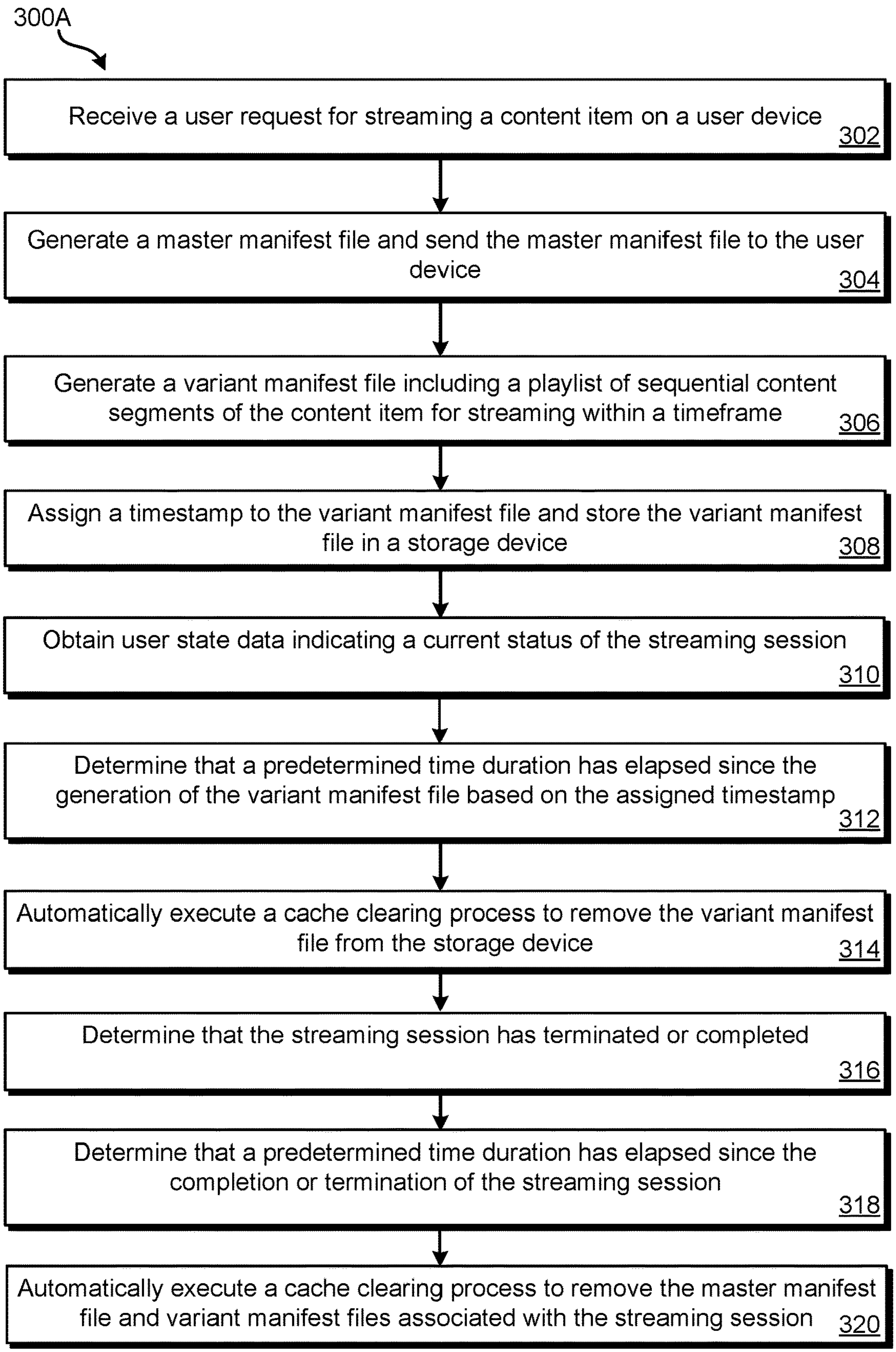
FIGS. 3A-3B are flow diagrams respectively illustrating example methods for managing streaming session data, according to various embodiments of the present disclosure.
Figure 3B:
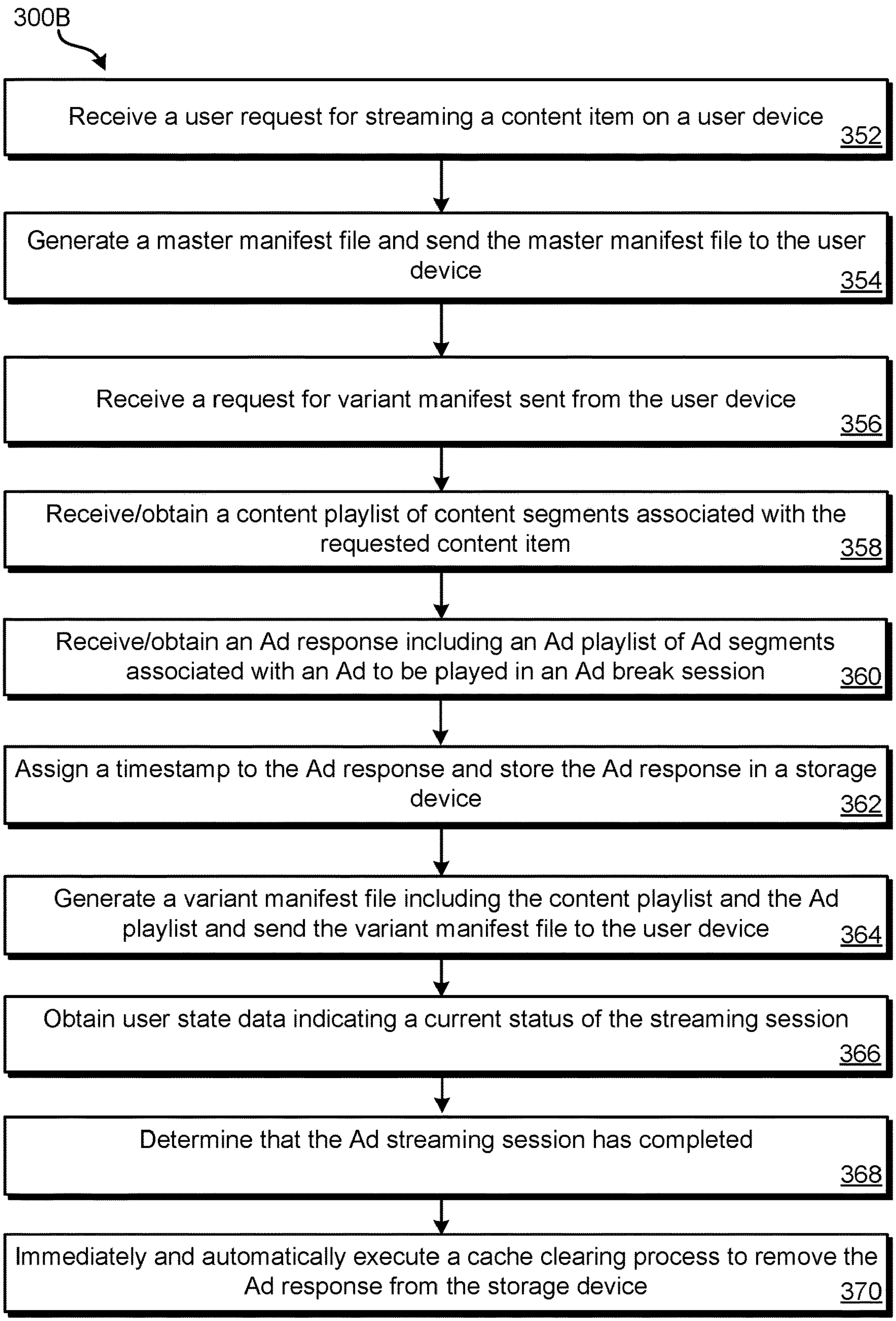

FIGS. 3A-3B are flow diagrams respectively illustrating example methods 300A and 300B for providing streaming service and managing streaming session data. Methods 300A and 300B may be performed by the communications system 100 or any component thereof, such as the manifest management system 110, storage server 120, content provider 130, Ad provider 140, etc. FIG. 3A illustrates method 300A. In the illustrated example, method 300A may include operations/steps 302-320. Few or additional operations/steps may be included. The operations of method 300A may be combined with operations of another method described herein in any suitable manner.

At 302, a user request for streaming a content item on a user device is sent to and received by a manifest management system. At 304, a master manifest file is generated by the manifest management system and sent to the user device. At 306, a streaming session is initiated by the user device, and a series of requests are generated by the user device and continuously and periodically sent to the manifest management system 110. In response to the requests, the manifest management system continuously and periodically generates a series of variant manifest files respectively corresponding to the series of requests. Each variant manifest file includes a playlist of sequential content segments of the content item for streaming within a specified timeframe. In some embodiments, the manifest management system may receive a playlist file and a stream control file, and generate the variant manifest file based on the information provided in the playlist file and the stream control file. At 308, the manifest management system assigns a timestamp to the variant manifest file and send the variant manifest file to a storage device to cause the variant manifest to be stored/cached in the storage device. The user device initiates playback of the content segments and maintains continuation of the playback according to the received variant manifest files.

At 310, real-time user state data indicating a current playback status of the streaming session during the streaming session is obtained by the manifest management system. In some embodiments, the manifest management system receives status messages periodically generated by and sent from the user device. Each status message indicates the current status (e.g., a current time, a current playback position, etc.) of the streaming session at the time when the status message is generated.

At 312, a first determination is made, by the manifest management system, that a predetermined time (e.g., 1-10 minutes) duration has elapsed since the generation of the variant manifest file based on the current status of the streaming session and the assigned timestamp. At 314, a first cache clearing process is immediately and automatically executed in response to the first determination to remove the variant manifest file from the storage device.

At 316, a second determination is made, by the manifest management system, that the streaming session has been terminated or completed, based on the user state data or a notification sent from the user device. At 318, a third determination is made, by the manifest management system, that a predetermined time duration (e.g., 1-10 minutes) has elapsed since the completion or termination of the streaming session, and no request for variant manifest is received thereafter. At 320, a second cache clearing process is immediately and automatically executed in response to the first or third determination to remove session data associated with the streaming session from the storage device. The session data may include the master manifest file, variant manifest files, Ad response, Ad templates, user state data, etc. associated with the streaming session.

FIG. 3B illustrates method 300B. In the illustrated example, method 300B may include operations/steps 352-370. Few or additional operations/steps may be included. The operations of method 300B may be combined with operations of another method described herein in any suitable manner.

At 352, a user request for streaming a content item on a user device is sent to and received by a manifest management system. At 354, a master manifest file is generated by the manifest management systema and sent to the user device. At 356, a series of requests are received in the manifest management system. The series of requests are continuously and periodically generated by the user device upon initiation of the streaming session.

At 358, in response to each request for variant manifest, the manifest management system sends a request to the playlist generator and receives a content playlist of content segments associated with the requested content item to be played in a specified timeframe within the streaming session. At 360, upon a determination that an upcoming Ad break session is within a predetermined time duration (e.g., 10 seconds to 1 minute) from the current status of the streaming session, the manifest management system sends a request to the Ad provider and receives an Ad response from the Ad provider. The Ad response includes an Ad playlist of Ad segments associated with an Ad to be played in the Ad break session within the streaming session and an Ad template. At 362, a timestamp is assigned to the Ad response, and the Ad response is stored in the storage device.

At 364, a variant manifest file is generated by the manifest management system. The variant manifest file includes the content playlist and the Ad playlist. A variant manifest response including the variant manifest file and the Ad template is generated by the manifest management system and sent to the user device. The user device initiates an Ad break session for playback of the Ad segments specified in the variant manifest response according to the Ad template.

At 366, real-time user state data indicating a current playback status of the streaming session is obtained by the manifest management system. In some embodiments, the manifest management system receives status messages periodically generated by and sent from the user device. Each status message indicates the current status (e.g., a current time, a current playback position, etc.) of the streaming session at the time when the status message is generated.

At 368, a determination is made that the Ad break session is completed or that the playback of the Ad segments specified in the variant manifest file is completed, based on the current playback status indicated by the user state data. At 370, a cache clearing process is immediately and automatically executed to remove the Ad response associated with the Ad break session from the storage device.

Figure 4:
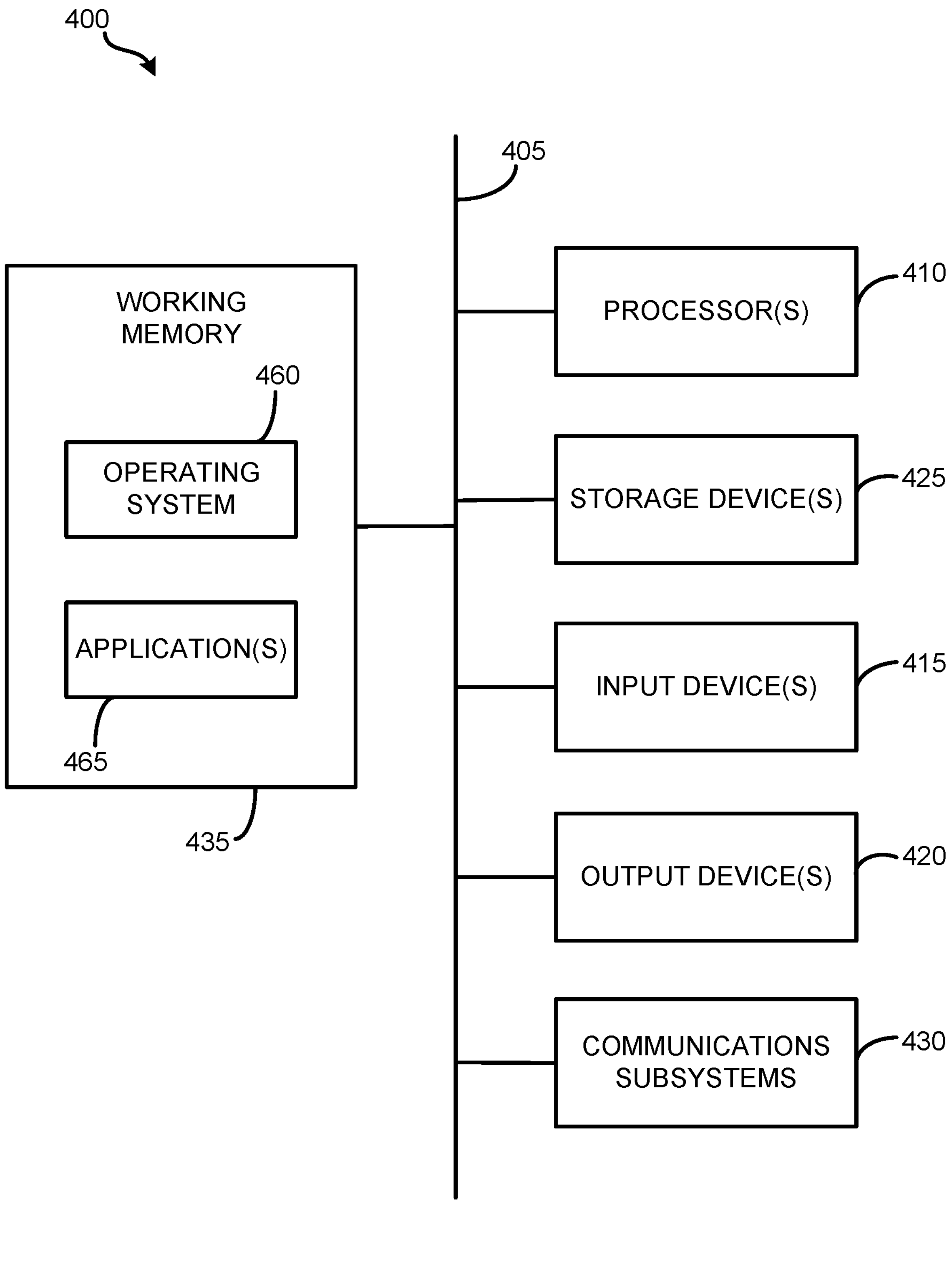
FIG. 4 illustrates an example computer system or computer device, according to various embodiments of the present disclosure.

The communications systems 100 or any components thereof, such as the user device 101, manifest management system 110, storage server 120, content provider 130, Ad provider 140, Ad server 150, etc., described above may include a computer system that further includes computer hardware and software that form special-purpose network circuitry to implement various embodiments such as communication, generation of data, determination, identification, calculation, execution of a process, and other operations or steps of the methods or processes described herein. FIG. 4 is a schematic diagram illustrating an example of computer system 400. The computer system 400 is a simplified computer system that can be used to implement various embodiments described and illustrated herein. FIG. 4 provides a schematic illustration of one embodiment of a computer system 400 that can perform some or all of the steps of the methods and workflows provided by various embodiments. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown including hardware elements that can be electrically coupled via a bus 405, or may otherwise be in communication, as appropriate. The hardware elements may include one or more processors 410, including without limitation one or more general-purpose processors and/or one or more special-purpose processors such as digital signal processing chips, graphics acceleration processors, and/or the like; one or more input devices 415, which can include without limitation a mouse, a keyboard, a camera, and/or the like; and one or more output devices 420, which can include without limitation a display device, a printer, and/or the like.

The computer system 400 may further include and/or be in communication with one or more non-transitory storage devices 425, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 400 might also include a communications subsystem 430, which can include without limitation a modem, a network card (wireless or wired), an infrared communication device, a wireless communication device, and/or a chipset such as a Bluetooth™ device, a 802.11 device, a Wi-Fi device, a WiMAX device, cellular communication facilities, etc., and/or the like. The communications subsystem 430 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 430. In other embodiments, a portable electronic device, e.g., the first electronic device, may be incorporated into the computer system 400, e.g., an electronic device as an input device 415. In some embodiments, the computer system 400 will further include a working memory 435, which can include a RAM or ROM device, as described above.

The computer system 400 also can include software elements, shown as being currently located within the working memory 435, including an operating system 460, device drivers, executable libraries, and/or other code, such as one or more application programs 465, which may include computer programs provided by various embodiments, and/or may be designed to implement methods, and/or configure systems, provided by other embodiments, as described herein. Merely by way of example, one or more procedures described with respect to the methods discussed above, such as those described in relation to FIG. 4, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 425 described above. In some cases, the storage medium might be incorporated within a computer system, such as computer system 400. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 400 and/or might take the form of source and/or installable code, which, upon compilation and/or installation on the computer system 400 e.g., using any of a variety of generally available compilers, installation programs, compression/decompression utilities, etc., then takes the form of executable code.

It will be apparent that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 400 to perform methods in accordance with various embodiments of the technology. According to a set of embodiments, some or all of the operations of such methods are performed by the computer system 400 in response to processor 410 executing one or more sequences of one or more instructions, which might be incorporated into the operating system 460 and/or other code, such as an application program 465, contained in the working memory 435. Such instructions may be read into the working memory 435 from another computer-readable medium, such as one or more of the storage device(s) 425. Merely by way of example, execution of the sequences of instructions contained in the working memory 435 might cause the processor(s) 410 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 400, various computer-readable media might be involved in providing instructions/code to processor(s) 410 for execution and/or might be used to store and/or carry such instructions/code. In many implementations, a computer-readable medium is a physical and/or tangible storage medium. Such a medium may take the form of non-volatile media or volatile media. Non-volatile media include, for example, optical and/or magnetic disks, such as the storage device(s) 425. Volatile media include, without limitation, dynamic memory, such as the working memory 435.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400.

The communications subsystem 430 and/or components thereof generally will receive signals, and the bus 405 then might carry the signals and/or the data, instructions, etc. carried by the signals to the working memory 435, from which the processor(s) 410 retrieves and executes the instructions. The instructions received by the working memory 435 may optionally be stored on a non-transitory storage device 425 either before or after execution by the processor(s) 410.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Various aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a segment" includes a plurality of such segments, and reference to "the processor" includes reference to one or more processors and equivalents thereof known in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method comprising:

receiving, by a dynamic manifest server, a request for streaming a content item in a streaming session initiated on a user device;

obtaining, by the dynamic manifest server, a content playlist including a plurality of content segments associated with the content item;

sending, by the dynamic manifest server, a request for advertisement (Ad) to be played in an Ad break session within the streaming session to an Ad provider;

obtaining, by the dynamic manifest server, an Ad response from the Ad provider, the Ad response including an Ad playlist of a plurality of Ad segments associated with the Ad;

sending, by the dynamic manifest server, the Ad response to a storage device configured to store the Ad response by the storage device;

generating, by the dynamic manifest server, a variant manifest file including the content playlist and the Ad segments of the Ad playlist inserted in the content playlist;

sending the variant manifest file to the user device configured to initiate playback of the content segments and the Ad segments specified in the variant manifest file by the user device;

obtaining real-time user state data indicating a current playback status of the streaming session; and in response to receiving, from the user device, a first notification that playback of the Ad segments in the Ad break session has been completed, automatically generating, by the dynamic manifest server, a second notification to the storage device to cause the storage device to execute a first cache clearing process to remove the Ad response from the storage device based on an elapsed duration after completion of the Ad break session.

2. The method of claim 1, further comprising:

before the sending the request for Ad, determining, by the dynamic manifest server, that the Ad break session is within a first predetermined time duration from the current playback status, wherein the first predetermined time duration is of 30 seconds.

3. The method of claim 1, further comprising:

in response to the request for streaming the content item, generating, by the dynamic manifest server, a master manifest file; and sending, by the dynamic manifest server, the master manifest file to the user device.

4. The method of claim 3, further comprising:

determining, by the dynamic manifest server, that the streaming session has been terminated or completed, based on the current playback status of the streaming session;

determining, by the dynamic manifest server, that a second time duration has elapsed since the termination or completion of the streaming session; and in response, automatically executing, by the storage device, a second cache clearing process to remove the master manifest file and the variant manifest file associated with the streaming session from the storage device.

5. The method of claim 1, wherein the Ad response further comprises an Ad template configured to guide the playback of the Ad segments specified in the Ad response, and the Ad template is sent to the user device along with the variant manifest file.

6. The method of claim 1, further comprising:

receiving, in the dynamic manifest server, a plurality of status messages periodically generated by and sent from the user device, wherein the real-time user state data is generated based on the status messages.

7. The method of claim 1, further comprising:

assigning, by the dynamic manifest server, a timestamp to the variant manifest file; and sending, by the dynamic manifest server, the variant manifest file to the storage device configured to store the variant manifest file in the storage device.

8. The method of claim 7, further comprising:

determining, by the dynamic manifest server, that a second time duration has elapsed since the generation of the variant manifest file, based on the current playback status of the streaming session and the timestamp assigned to the variant manifest file; and in response, automatically executing, by the storage device, a second cache clearing process to remove the variant manifest file from the storage device.

9. The method of claim 8, wherein the second time duration is of 3-10 minutes.

10. The method of claim 7, further comprising:

determining, by the dynamic manifest server, that the playback of the content segments specified in the variant manifest file has been completed, based on the current playback status of the streaming session; and in response, automatically executing, by the storage device, a second cache clearing process to remove the variant manifest file associated with the streaming session from the storage device.

11. A system comprising:

a manifest server in communication with a user device; and a storage device in communication with the manifest server, wherein the manifest server is configured to:

receive a request for streaming a content item in a streaming session initiated on a user device;

obtain a content playlist including a plurality of content segments associated with the content item;

send a request for advertisement (Ad) to be played in an Ad break session within the streaming session to an Ad provider;

obtain an Ad response from the Ad provider, the Ad response including an Ad playlist of a plurality of Ad segments associated with the Ad;

send the Ad response to the storage device;

generate a variant manifest file including the content playlist and the Ad segments of the Ad playlist inserted in the content playlist;

send the variant manifest file to the user device configured to initiate playback of the content segments and the Ad segments specified in the variant manifest file by the user device;

obtain real-time user state data indicating a current playback status of the streaming session; and in response to receiving, from the user device, a first notification that playback of the Ad segments in the Ad break session has been completed, automatically generate a second notification to the storage device to cause the storage device to execute a first cache clearing process to remove the Ad response from the storage device based on an elapsed duration after completion of the Ad break session;

the storage device is configured to:

store the Ad response received from the manifest server in the storage device; and automatically execute the first cache clearing process to remove the Ad response from the storage device based on the elapsed duration after completion of the Ad break session, in response to receiving the second notification.

12. The system of claim 11, wherein the manifest server is further configured to:

determine, before the sending the request for Ad, that the Ad break session is within a first predetermined time duration from the current playback status, wherein the first predetermined time duration is of 30 seconds.

13. The system of claim 11, wherein the manifest server is further configured to:

generate, in response to the request for streaming the content item, a master manifest file; and sending the master manifest file to the user device.

14. The system of claim 13, wherein the manifest server is further configured to:

determine that the streaming session has been terminated or completed, based on the current playback status of the streaming session; and determine that a second time duration has elapsed since the termination or completion of the streaming session; and wherein the storage device is configured to automatically execute, in response to the determination that the streaming session has been terminated or completed and the determination that a second time duration has elapsed since the termination or completion of the streaming session, a second cache clearing process to remove the master manifest file and the variant manifest file associated with the streaming session from the storage device.

15. The system of claim 11, wherein the Ad response further comprises an Ad template configured to guide the playback of the Ad segments specified in the Ad response, and the Ad template is sent to the user device along with the variant manifest file.

16. The system of claim 11, wherein the manifest server is further configured to:

receive a plurality of status messages periodically generated by and sent from the user device, wherein the real-time user state data is generated based on the status messages.

17. The system of claim 11, wherein the manifest server is further configured to:

assign a timestamp to the variant manifest file; and send the variant manifest file to the storage device.

18. The system of claim 17, wherein the manifest server is further configured to determine that a second time duration has elapsed since the generation of the variant manifest file, based on the current playback status of the streaming session and the timestamp assigned to the variant manifest file; and wherein the storage device is further configured to automatically execute, in response to the determination that the second time duration has elapsed since the generation of the variant manifest file, a second cache clearing process to remove the variant manifest file from the storage device.

19. The system of claim 17, wherein the manifest server is further configured to determine that the playback of the content segments specified in the variant manifest file has been completed, based on the current playback status of the streaming session; and wherein the storage device is further configured to automatically execute, in response to the determination that the playback of the content segments specified in the variant manifest file has been completed, a second cache clearing process to remove the variant manifest file associated with the streaming session from the storage device.

20. One or more non-transitory, machine-readable media having machine-readable instructions thereon which, when executed by one or more processing devices, cause a system to perform operations comprising:

receiving a request for streaming a content item in a streaming session initiated on a user device;

obtaining a content playlist including a plurality of content segments associated with the content item;

sending a request for advertisement (Ad) to be played in an Ad break session within the streaming session to an Ad provider;

obtaining an Ad response from the Ad provider, the Ad response including an Ad playlist of a plurality of Ad segments associated with the Ad;

sending the Ad response to a storage device configured to store the Ad response by the storage device;

generating a variant manifest file including the content playlist and the Ad segments of the Ad playlist inserted in the content playlist;

sending the variant manifest file to the user device configured to initiate playback of the content segments and the Ad segments specified in the variant manifest file by the user device;

obtaining real-time user state data indicating a current playback status of the streaming session; and in response to receiving, from the user device, a first notification that playback of the Ad segments in the Ad break session has been completed, automatically generating a second notification to the storage device to cause the storage device to execute a first cache clearing process to remove the Ad response from the storage device based on an elapsed duration after completion of the Ad break session.

* * * * *